United States Patent
Andrasko et al.

(10) Patent No.: US 10,611,451 B1
(45) Date of Patent: Apr. 7, 2020

(54) SELF-CALIBRATING JOYSTICK CONTROL SYSTEM AND METHOD

(71) Applicant: Brunswick Corporation, Mettawa, IL (US)

(72) Inventors: Steven J. Andrasko, Oshkosh, WI (US); Jason S. Arbuckle, Horicon, WI (US); Thomas S. Kirchhoff, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 205 days.

(21) Appl. No.: 15/813,598

(22) Filed: Nov. 15, 2017

Related U.S. Application Data (60) Provisional application No. 62/425,676, filed on Nov. 23, 2016.

(51) Int. Cl.

| | |
|---|---|
| G06F 3/033 | (2013.01) |
| B62D 6/00 | (2006.01) |
| G05B 15/02 | (2006.01) |
| B63H 21/21 | (2006.01) |
| B63H 25/02 | (2006.01) |
| B63J 99/00 | (2009.01) |
| G06F 3/0338 | (2013.01) |
| G06F 3/038 | (2013.01) |

(52) U.S. Cl.
CPC ........... B63H 21/213 (2013.01); B63H 25/02 (2013.01); B63H 2025/022 (2013.01); B63H 2025/026 (2013.01); B63J 2099/006 (2013.01); G06F 3/038 (2013.01); G06F 3/0338 (2013.01)

(58) Field of Classification Search
CPC .................. B63H 21/213; B63H 25/02; B63H 2025/022; B63H 2025/026; B63J 2099/006; G06F 3/0338; G06F 3/038
See application file for complete search history.

(56) References Cited

U.S. PATENT DOCUMENTS

| | | | |
|---|---|---|---|
| 6,234,853 | B1 | 5/2001 | Lanyi et al. |
| 6,273,771 | B1 | 8/2001 | Buckley et al. |
| 6,704,643 | B1 | 3/2004 | Suhre et al. |
| 7,037,150 | B2 | 5/2006 | Morvillo |
| 7,267,068 | B2 | 9/2007 | Bradley et al. |
| 7,467,595 | B1 | 12/2008 | Lanyi et al. |
| 8,117,890 | B1 | 2/2012 | Durmeyer et al. |
| 8,131,412 | B2 | 3/2012 | Larsson et al. |

(Continued)

*Primary Examiner* — Jerrah Edwards
(74) *Attorney, Agent, or Firm* — Andrus Intellectual Property Law, LLP (57) ABSTRACT

A method for calibrating a marine propulsion system that controls operation of a marine propulsion device on a marine vessel includes accepting an input signal from a user input device and determining an output signal corresponding to the input signal based on one or more stored parameters. The stored parameters are pre-calibrated to result in a predefined maneuver of the marine vessel. The marine propulsion device is operated according to the output signal and it is determined if any un-commanded maneuvers of the marine vessel result while operating the marine propulsion device according to the output signal. The method includes adapting one or more of the stored parameters so as to adjust operation of the marine propulsion device to abate the un-commanded vessel maneuvers. The one or more adapted parameters are saved and are used to determine subsequent output signals corresponding to subsequent input signals from the user input device.

20 Claims, 5 Drawing Sheets

(56) References Cited

U.S. PATENT DOCUMENTS

| | | |
|---|---|---|
| 8,417,399 B2 | 4/2013 | Arbuckle et al. |
| 8,478,464 B2 | 7/2013 | Arbuckle et al. |
| 8,700,238 B2 | 4/2014 | Hiramatsu |
| 2015/0266557 A1 | 9/2015 | Morikami et al. |

| Joystick Input | Starboard Propulsion Device | Port Propulsion Device |
|---|---|---|
| Forward | Gear / Thrust / Angle | Gear / Thrust / Angle |
| Backward | Gear / Thrust / Angle | Gear / Thrust / Angle |
| Right | Gear / Thrust / Angle | Gear / Thrust / Angle |
| Left | Gear / Thrust / Angle | Gear / Thrust / Angle |
| Yaw CW | Gear / Thrust / Angle | Gear / Thrust / Angle |
| Yaw CCW | Gear / Thrust / Angle | Gear / Thrust / Angle |

| Ex. | FX | FY | M | θa | θb | Ta | Tb |
|---|---|---|---|---|---|---|---|
| 1 | x | y | m | A | B | C | D |
| 2 | 0 | 0 | m | 0 | 0 | +C | −D |
| 3 | x | 0 | 0 | A | B | 0 | 0 |
| 4 | x | 0 | 0 | A | B | +C | −D |
| 5 | x | y | 0 | A | B | C | D |
| 6 | 0 | +y | 0 | A | B | C | D |
| 7 | 0 | −y | 0 | A | B | C | D |

*FIG. 7*

| Ex. | FX | FY | M | θa | θb | Ta | Tb |
|---|---|---|---|---|---|---|---|
| 1 | x | y | m | -- | -- | -- | -- |
| 2 | 0 | 0 | m | -- | -- | E | -- |
| 3 | x | 0 | 0 | F | G | -- | -- |
| 4 | x | 0 | 0 | -- | -- | H | I |
| 5 | x | y | 0 | J | K | -- | -- |
| 6 | 0 | +y | 0 | -- | -- | L | M |
| 7 | 0 | −y | 0 | -- | -- | N | O |

*FIG. 8*

SELF-CALIBRATING JOYSTICK CONTROL SYSTEM AND METHOD

CROSS-REFERENCE TO RELATED APPLICATION

The present application claims the benefit of U.S. Provisional Application Ser. No. 62/425,676, filed Nov. 23, 2016, which is hereby incorporated by reference herein.

FIELD

The present disclosure relates to joystick control systems for marine vessels having marine propulsion systems/devices propelling the vessel.

BACKGROUND

U.S. Pat. No. 6,234,853 discloses a docking system which utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

U.S. Pat. No. 6,273,771 discloses a control system for a marine vessel incorporating a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,467,595 discloses a method for controlling the movement of a marine vessel, including rotating one of a pair of marine propulsion devices and controlling the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

The above U.S. patents are hereby incorporated by reference herein.

SUMMARY

According to one example of the present disclosure, a method for calibrating a joystick control system on a marine vessel having a marine propulsion device coupled thereto is disclosed. The method includes accepting from a joystick a predefined movement intended to carry out a predefined vessel maneuver and determining, with a control module, an output signal corresponding to the predefined movement of the joystick. The method includes controlling the propulsion device according to the output signal and measuring a responsive maneuver of the marine vessel. The method also includes using high-gain feedback control to adapt the output signal until an error between the responsive vessel maneuver and the predefined vessel maneuver is below a desired threshold. In response to the error dropping below the desired threshold, the method includes storing the adapted output signal in connection with the predefined movement of the joystick in a memory of the control module. The method then includes controlling the propulsion device according to the adapted output signal in response to the predefined movement of the joystick during subsequent operation of the control system.

According to another example of the present disclosure, a method for calibrating a marine propulsion system that controls operation of a marine propulsion device on a marine vessel is disclosed. The method includes accepting an input signal from a user input device and determining an output signal corresponding to the input signal based on one or more stored parameters. The stored parameters are pre-calibrated to result in a predefined maneuver of the marine vessel. The method then includes operating the marine propulsion device according to the output signal and determining if any un-commanded maneuvers of the marine vessel result while operating the marine propulsion device according to the output signal. The method includes adapting one or more of the stored parameters so as to adjust operation of the marine propulsion device to abate the un-commanded vessel maneuvers. The method also includes saving the one or more adapted parameters and using the adapted parameters to determine subsequent output signals corresponding to subsequent input signals from the user input device.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods.

Figure 1:
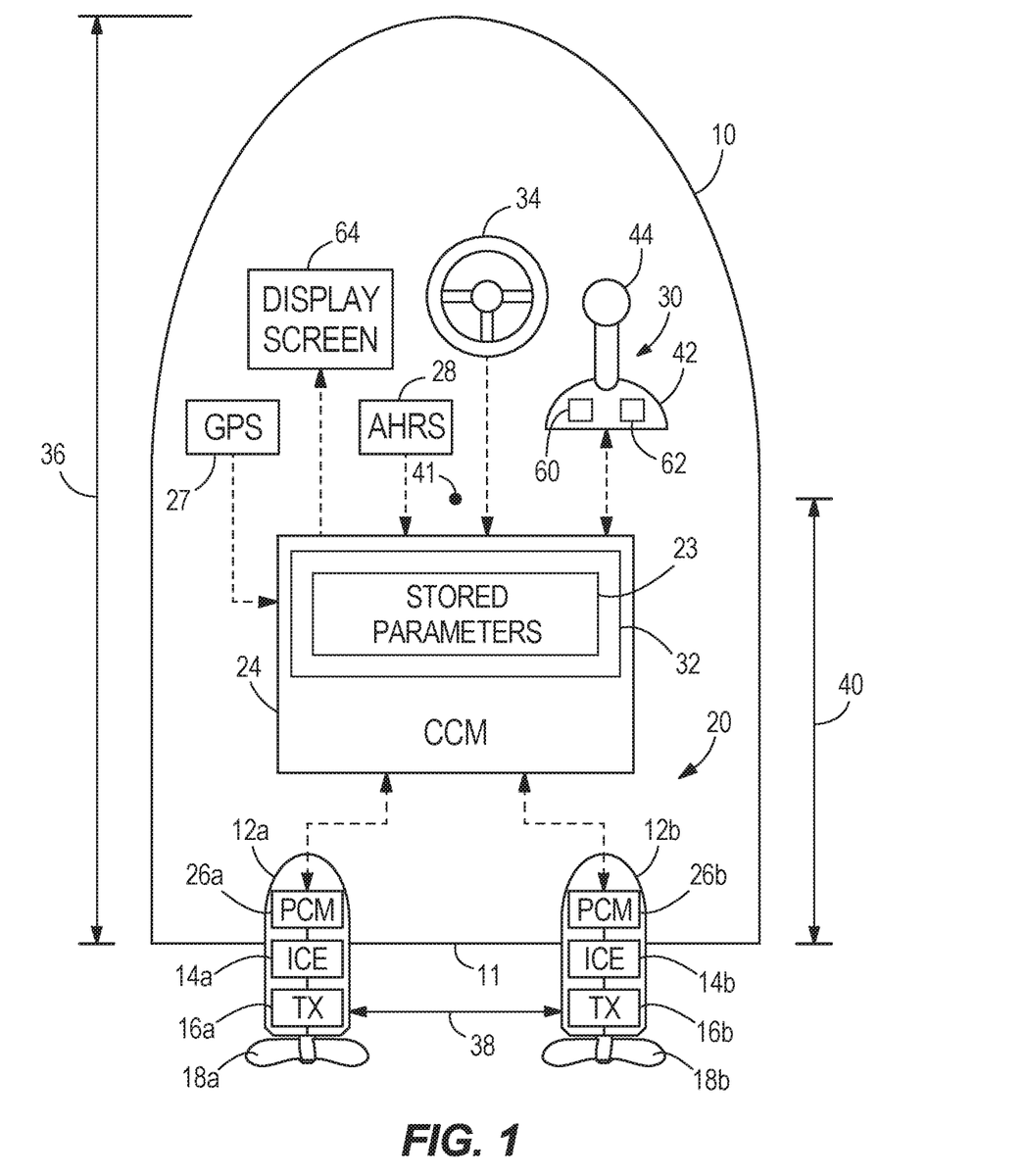
FIG. 1 is a schematic representation of a joystick control system on a marine vessel.

FIG. 1 shows a marine vessel 10. The marine vessel 10 is capable of operating, for example, in a joysticking mode, among other modes, as described herein below. The marine vessel 10 has first and second propulsion devices 12a, 12b coupled thereto, such as for example to its transom 11, that produce first and second thrusts to propel the marine vessel 10. As illustrated, the first and second propulsion devices 12a, 12b are outboard motors, but they could alternatively be inboard motors, stern drives, pod drives, jet drives, trolling motors, and/or the like. Note that fewer or more propulsion devices than the two shown could be provided. Each propulsion device 12a, 12b is provided with an engine 14a, 14b operatively connected to a transmission 16a, 16b, in turn operatively connected to a propeller 18a, 18b.

The marine vessel 10 also includes various control elements that make up a joystick propulsion control system 20. The control system 20 includes a propulsion system control module, such as for example the illustrated command control module (CCM) 24, in signal communication with propulsion control modules (PCM) 26a, 26b associated with the respective propulsion devices 12a, 12b. In other examples of the control system 20, only one control module is provided for the system rather than having both a CCM 24 and PCMs 26a, 26b. In other examples, one CCM is provided for each propulsion device 12a, 12b, and/or additional control modules are provided for controlling engine speed and functions separately from steering and trim of the propulsion devices 12a, 12b. For example, the PCMs 26a, 26b may control the engines 14a, 14b and transmissions 16a, 16b of the propulsion devices 12a, 12b, while additional thrust vector modules (TVMs) may control the steered orientation of the propulsion devices 12a, 12b. In examples in which more than two propulsion devices are provided on the marine vessel 10, a first CCM could control PCMs and TVMs of some of the propulsion devices, while a second CCM could control PCMs and TVMs of others of the propulsion devices. There are a multitude of possible combinations of control modules that could be provided as part of the system 20, and the examples provided are not meant to be limiting on the scope of the present disclosure.

In one example, signal communication between the vessel control elements, illustrated schematically by way of the dashed line connections, is provided by a CAN bus as described in U.S. Pat. No. 6,273,771. In other examples of the control system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The systems and methods described herein may be implemented by one or more computer programs executed by one or more processors, which may all operate as part of a single control module, such as for example the CCM 24. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage. For example, the CCM 24 is shown as including a memory 32.

As used herein, the term "control module" may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. A module may include memory (shared, dedicated, or group) that stores code executed by the processor. The term "code," as used herein, may include software, firmware, and/or microcode, and may refer to programs, routines, functions, classes, and/or objects. The term "shared," as used above, means that some or all code from multiple modules may be executed using a single (shared) processor. In addition, some or all code to be executed by multiple different processors may be stored by a single (shared) memory. The term "group," as used above, means that some or all code comprising part of a single module may be executed using a group of processors. Likewise, some or all code comprising a single module may be stored using a group of memories.

A joystick 30 can be used to input commands to the CCM 24. The CCM 24 in turn communicates with the first and second propulsion devices 12a, 12b by communicating with the PCMs 26a, 26b. The PCMs 26a, 26b (and/or TVMs or additional modules if provided) in turn activate actuators that move the throttles in the engines 14a, 14b, shift the clutches in the transmissions 16a, 16b, and move steering actuators to achieve desired thrust orientations of the propulsion devices 12a, 12b. The propulsion devices 12a, 12b are independently steerable about their steering axes. The joystick 30 can be used to allow the operator of the marine vessel 10 to manually maneuver the marine vessel 10, such as to achieve translation and/or rotation of the marine vessel 10, as will be described below.

A receiver for a global positioning system (GPS) device 27 may also be provided in communication with the CCM 24 and can provide information such as geographical location of the marine vessel 10, the vessel's course over ground (COG), and the vessel's speed over ground (SOG) to the CCM 24. An attitude and heading reference system (AHRS) 28 can also be provided, which may include an inertial measurement unit (IMU). The 9-axis AHRS 28 includes a 3-axis gyrometer, a 3-axis accelerometer, and a 3-axis magnetometer which provide the CCM 24 with information regarding the yaw rate and left/right and fore/aft movements of the vessel 10. The AHRS 28 can also measure the pitch and roll of the marine vessel 10 as well as its heading.

Figure 2:
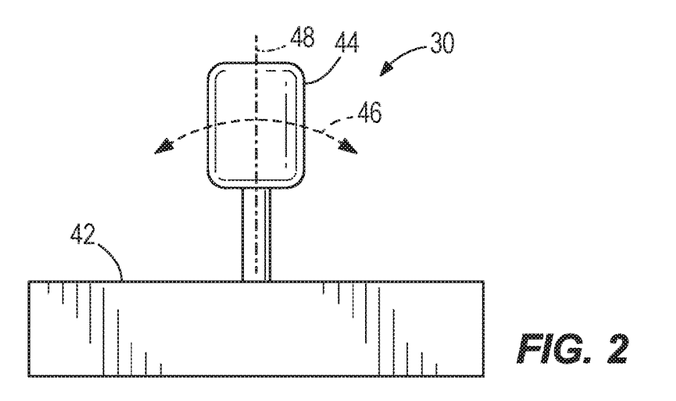
FIG. 2 is a side view of a joystick used in conjunction with the marine vessel of the present disclosure.
Figure 3:
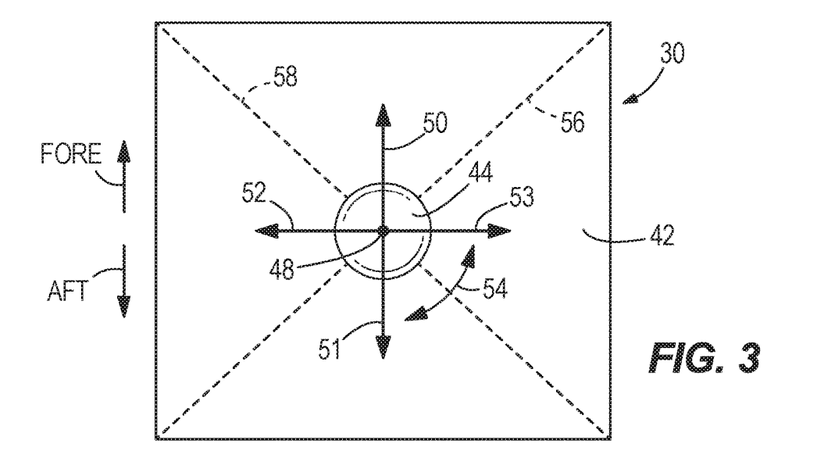
FIG. 3 is a top view of the joystick.

Referring to FIGS. 2 and 3, operation of an exemplary joystick 30 that can be used to provide inputs to the control system 20 on the marine vessel 10 will be described. FIG. 2 is a simplified schematic representation of the joystick 30, which is a manually operable user input device that can be used to provide a signal that is representative of a desired movement selected by an operator of the marine vessel 10. The example in FIG. 2 shows a base portion 42 and a handle 44 which can be manipulated by hand. In a typical application, the handle 44 is movable in the direction generally represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIG. 2, a similar type of movement is possible in other directions that are not parallel to the plane of the drawing.

FIG. 3 is a top view of the joystick 30. The handle 44 can move, as indicated by arrow 46 in FIG. 2, in various directions which include those represented by arrows 50, 51, 52 and 53. However, it should be understood that the handle 44 can move in any direction relative to its axis 48 and is not limited to the lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Note that there are many different types of user input devices that can be used to provide a signal that is representative of a desired movement of the marine vessel 10, as expressed by the operator of the marine vessel through movement of the handle 44. For example, a keypad, track ball, and/or other similar input device that allows inputs in four or more directions could be used.

With continued reference to FIG. 3, it can be seen that the operator can demand a purely linear movement either toward port as represented by arrow 52 or starboard as represented by arrow 53, a purely linear movement in a forward direction as represented by arrow 50 or a reverse direction as represented by arrow 51, or any combination of two of these directions. For example, by moving the handle 44 along dashed line 56, a linear movement toward the starboard side and forward or toward the port side and rearward can be commanded. Similarly, a linear movement along line 58 could be commanded. It should be understood that the operator of the marine vessel 10 can also request a combination of sideways or forward/reverse linear movement in combination with a rotation as represented by arrow 54. Any of these possibilities can be accomplished through use of the joystick 30, which communicates with the CCM 24. The magnitude, or intensity, of movement represented by the position of the handle 44 is also provided as an output from the joystick 30. In other words, if the handle 44 is moved slightly toward one side or the other, the commanded thrust in that direction is less than if, alternatively, the handle 44 was moved by a greater magnitude away from its vertical position with respect to the base portion 42. Furthermore, rotation of the handle 44 about axis 48, as represented by arrow 54, provides a signal representing the intensity of desired yaw. A slight rotation of the handle 44 about axis 48 would represent a command for a slight rotational thrust about a preselected point on the marine vessel 10. On the other hand, a more intense rotation of the handle 44 about its axis 48 would represent a command for a higher magnitude of rotational thrust.

Figure 4:
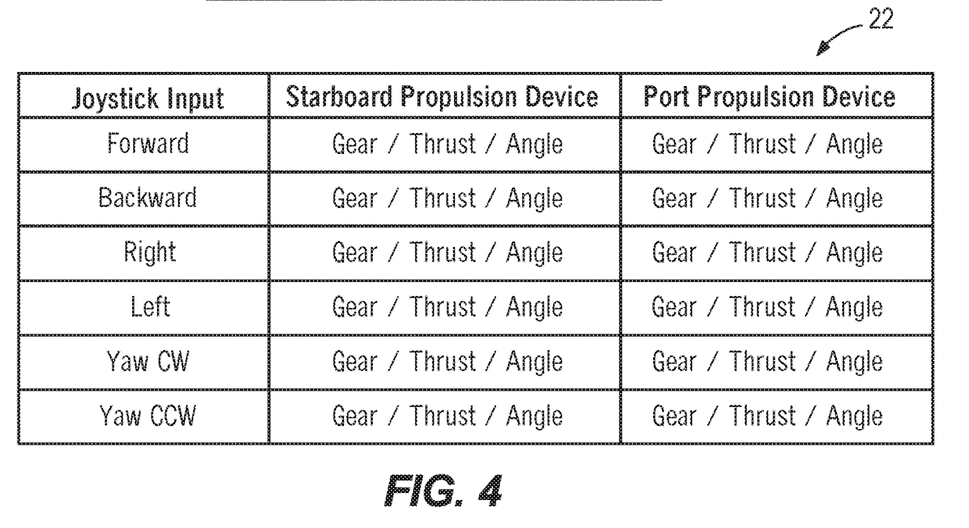
FIG. 4 provides an example of a calibrated lookup table for the joystick control system of the present disclosure.

By way of example only, a lookup table 22 is provided in FIG. 4 to show how the CCM 24 may translate movements of the joystick 30 into output signals to be provided to the propulsion devices 12a, 12b. For example, in response to movement of the joystick's handle 44, an input signal is generated by potentiometers or a Hall effect sensor as a value or percentage along each of the left/right, fore/aft, and rotational axes. In response to the input signal from the potentiometer or the Hall effect sensor, the CCM 24 may output a signal to the PCMs 26a, 26b to place the propulsion devices 12a, 12b in particular gears, to open their throttles to produce particular magnitudes of thrust, and to rotate them to particular steering positions. The exemplary lookup table 22 shown herein may be stored in the memory 32 of the CCM 24 (see FIG. 1). Note that the exemplary lookup table 22 does not take into account that the magnitude of the input to the joystick 30 may vary. This may be accounted for by multipliers, an expanded lookup table, and/or further lookup tables stored in the memory 32 of the CCM 24. Note also that for brevity's sake not all input options are listed in the first column of the lookup table 22, and diagonal movements and combined translational and yaw movements, for example, are left out. It should be understood that the lookup table 22 may instead be another type of input-output map or programmed calculation that converts a sensed movement of or input to the joystick 30 to an output signal to the PCMs 26s, 26b.

As noted, the joystick control system 20 may be initially calibrated such that a given movement of the joystick handle 44 (corresponding to, e.g., a given percentage along the left/right, fore/aft, and/or rotational axes) results in an output signal (e.g., determined by way of a lookup table 22, a series of lookup tables, and/or an equation or series of equations) that commands a pre-programmed gear, throttle position, and steering position of the propulsion devices 12a, 12b. However, due to various factors including the design, number, and location of the propulsion devices 12a, 12b; the design of the marine vessel 10; the design of the joystick 30; etc., a given movement of the joystick 30 may not result in the exact intended or expected maneuver of the marine vessel 10. For example, a joystick command to translate to the left with no forward or backward movement and no rotation might actually result in, for example, unintended yaw. Therefore, it is required that the lookup table 22 calibrations be customized for a particular joystick 30 controlling particular propulsion devices 12a, 12b on a particular marine vessel 10. The primary purpose of this customization is to provide a vessel response to joystick movement that is what the operator expects. Usually, such customized calibrations require a trained engineer to be on the marine vessel 10 and to physically alter the calibration tables to dial in the desired joystick behavior. Sometimes, a boat manufacturer will use a learning strategy in which the operator moves the marine vessel 10 in a predefined manner and the required joystick position/input is observed and recorded, resulting in an offset to the normal operating joystick position. However, this type of calibration does not result in the refined feel of a system calibrated by a trained engineer. As the number of joystick-equipped boats increases, it is desirable to find a more robust and less manpower-intensive method of customized calibration. The ultimate goal is to avoid the requirement for a trained engineer to visit each application to customize its calibration.

The present disclosure aims to automate and improve upon the steps that a trained engineer would need to undertake to configure a new marine vessel 10 with a joystick control system 20. Capitalizing on the feedback available from the 9-axis AHRS 28, the yaw rate and left/right and fore/aft movements of the marine vessel 10 can be used along with location, SOG, and COG information from the GPS device 27 in order to calibrate a new control system 20 until the input to the joystick 30 results in an expected output vessel maneuver. Unique proportional, integral, derivative (PID) controllers can be used for translational and yaw movement, and adaptable values can be used as feed forward terms in order to ensure a quick response and minimal closed loop lag during such calibration.

According to the present method, a technician will still need to enter a few metrics into the control system 20 for storage thereof in the memory 32 of the CCM 24 before the system will be ready for operation. These metrics are easily measurable or represent prescribed values chosen by the vessel manufacturer. The CCM 24 will later use at least one of the measurable data and the prescribed data to determine the output signal to be sent to the propulsion devices 12*a*, 12*b*. The vessel manufacturer can provide these measurable and/or prescribed values to the joystick system manufacturer for entry into the memory 32 of the CCM 24 at the joystick manufacturer's location, i.e., the joystick system manufacturer need not visit the marine vessel 10 to enter and store these values.

The measureable data is just that: it is data that can be measured or observed about the vessel and then stored for use by the CCM 24. In one example, with reference to FIG. 1, the measureable data comprises one or more of:

a. A trim angle of the propulsion devices 12*a*, 12*b* at which a thrust produced by the propulsion devices is horizontally-oriented. This parameter is a function of the transom angle of the marine vessel 10 and can be used to adjust for the steepness of the transom.

b. A number of turns of a steering wheel 34 required to achieve a maximum steering angle of the propulsion devices. This parameter is sometimes referred to as the "number of turns lock-to-lock" and characterizes the tight or loose feel of the steering system.

c. Steering positions (angles) of the propulsion devices 12*a*, 12*b* that correspond to given positions of the steering wheel 34. This parameter is often in the form of an input-output map, which describes how the propulsion devices' steered angles change as the steering wheel 34 turns from 0-100% in either direction.

d. A maximum allowable steering angle of the propulsion devices 12*a*, 12*b*. This parameter is helpful on some marine vessels where a full turn of the propulsion device would cause it to interfere with something else, such as another propulsion device or the transom/hull.

e. A maximum speed of the marine vessel 10 f. A length 36 of the marine vessel 10. This parameter is used to determine the thrust vectors for each propulsion device 12*a*, 12*b* in response to an input to the joystick 30.

g. A separation distance 38 between a pair of marine propulsion devices 12*a*, 12*b* coupled to the marine vessel 10. This parameter is also used to determine the thrust vectors for each propulsion device 12*a*, 12*b*.

h. A horizontal distance 40 from the transom 11 or from the propulsion device 12*a* and/or 12*b* to a center of mass or a center of pressure 41 of the marine vessel 10. This parameter is also used to determine the thrust vectors for each propulsion device 12*a*, 12*b*.

i. A beam of the marine vessel 10. This parameter characterizes the vessel's width at its widest point as measured at the vessel's nominal waterline.

j. A hull type of the marine vessel 10 k. A displacement of the marine vessel 10. This parameter is sometimes defined as the weight of water which is displaced by the floating marine vessel 10.

l. A mass of the marine vessel 10 m. Gear case ratios transmissions 16*a*, 16*b* of the propulsion devices 12*a*, 12*b* n. A pitch of the propellers 18*a*, 18*b* of the propulsion devices 12*a*, 12*b*

The prescribed data includes parameters that can be selected and then implemented on the marine vessel 10 during manufacturing or initial calibration. In one example, the prescribed data comprises one or more of: a number of turns of the steering wheel 34 required in order to achieve a maximum steering angle of the propulsion devices 12*a*, 12*b*; steering angles of the propulsion devices 12*a*, 12*b* that correspond to given positions of the steering wheel 34; and a limit on a speed of an engine 14*a*, 14*b* powering the propulsion device 12*a*, 12*b* that is intended to prevent blowout of the propeller 18*a*, 18*b*.

The remaining fine tuning parameters, such as multipliers, adders, maps, and/or tables that currently require an engineer on the marine vessel 10 can then be adapted and controlled using feedback from the AHRS 28 and GPS device 27. For example, adaptable parameters 23 can be stored in the memory of the CCM 24 as base maps or equations that include or incorporate data compiled from existing vessels and the trends found from that data. In general, the auto-calibration described herein will correct for physical events that cannot be measured and that occur only while the joystick control system 20 is in use on a given marine vessel 10. Yaw feedback can be used as the primary input to the CCM 24 for center-of-gravity location determination and adaptation, and fore/aft movement can be the primary input to the CCM 24 for propulsion device efficiency determination and adaptation. Some adaptations of the stored parameters 23 could be made during a defined configuration mode mode, during which the vessel manufacturer is instructed to move the handle 44 of the joystick 30 through specified, predefined movements while the CCM 24 undertakes aggressive feedback control, such as by using high-gain feedback control. Subsequently, other adaptations and feedback controllers may continue running while the marine vessel 10 is in normal use by the consumer. These subsequent adaptations may be less aggressive, such as by way of low-gain feedback control and/or limits on P, I, and D terms.

Figure 5:
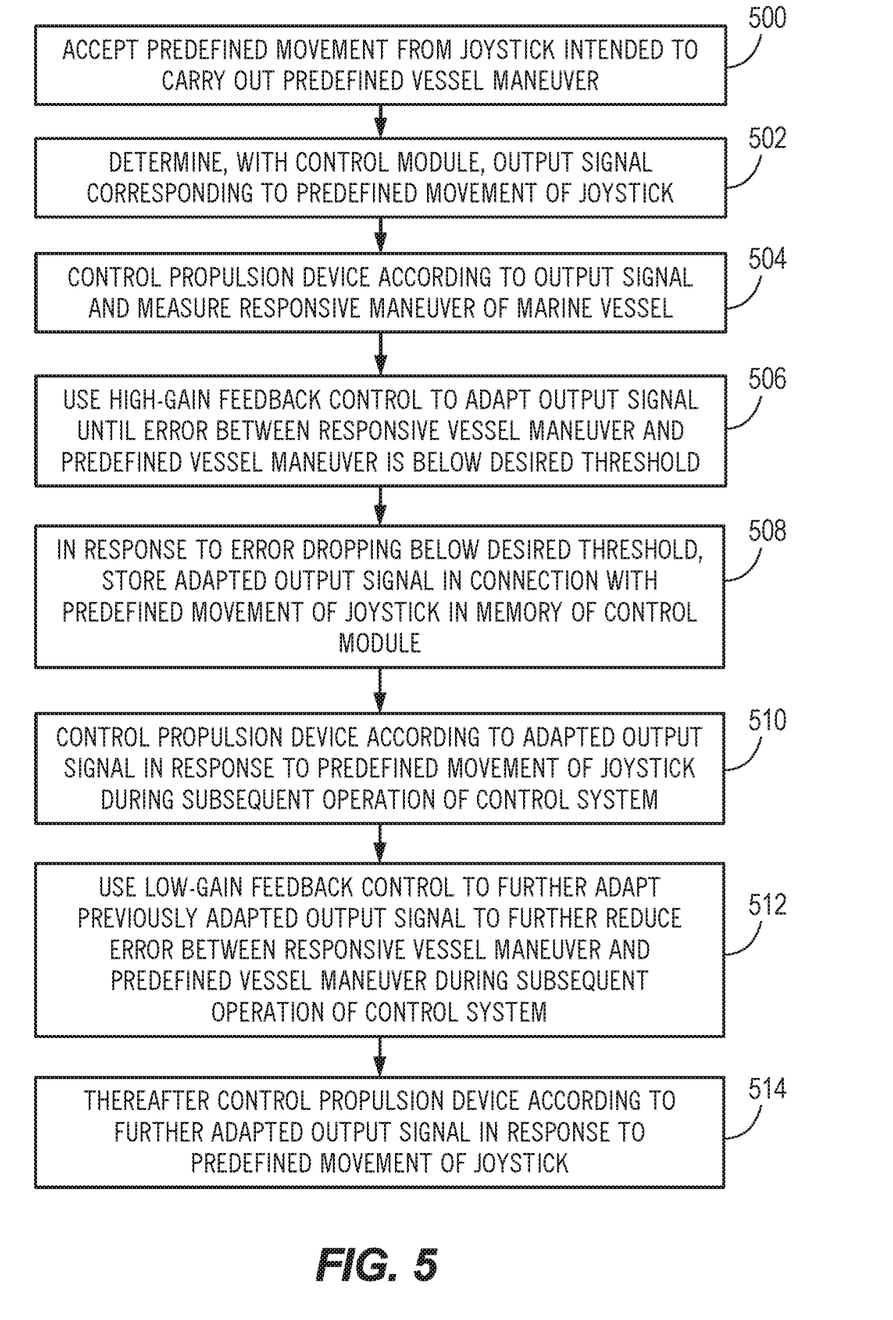
FIG. 5 illustrates one example of a method according to the present disclosure.

FIGS. 1 and 5 will be used to describe one example of a method for calibrating a joystick control system 20 on a marine vessel 10 having a marine propulsion device 12*a*, 12*b* coupled thereto, such as to its transom 11. Portions of the adaptation method can be performed in response to accepting a command to operate the control system 20 in a configuration mode. The configuration mode may be initiated by the operator, for example, by selecting a "configure" button 60 located on the base portion 42 of the joystick 30. Alternatively, the operator can select a "configure" mode via an option listed on a display screen 64, which can be a touch screen or can be associated with a keypad or other input device. In the configuration mode, the method may include prompting the operator of the control system 20 to move the handle 44 of the joystick 30 according to a predefined movement. This prompt could come via a pictorial display or written directions appearing on the display screen 64. Alternatively, lights or another display on the joystick 30 itself could prompt the operator to move the handle 44 in predetermined ways. Thereafter, the method includes accepting from the joystick 30 the predefined movement intended to carry out the predefined vessel maneuver, as shown at box 500. For example, the user may be prompted via the display screen 64 to rotate the handle 44 clockwise, which is intended to cause the marine vessel 10 to yaw in a clockwise direction with no lateral translation.

As shown at 502, the method includes determining, with a control module, an output signal (gear, thrust, steering angle) corresponding to the predefined movement of the joystick 30, such as by way of a computer program stored in the CCM 24. For example, the computer program may use the stored parameters 23 or a series of stored parameters, the lookup table 22 or a series of lookup tables, and/or an equation or series of equations, optionally including one or more multipliers, to convert an input signal from the joystick 30 into the output signal. At 504, the method includes controlling the propulsion device 12a, 12b according to the output signal, as described herein above, and measuring a responsive maneuver of the marine vessel 10, such as by way of the AHRS 28 and/or GPS device 27. Next, at 506, the method includes using high-gain feedback control to adapt the output signal until an error between the responsive vessel maneuver (as determined by the AHRS 28 and/or GPS device 27) and the predefined vessel maneuver (as intended by the input to the joystick 30) is below a desired threshold. Such adaptation will be described in more detail herein below. The desired threshold can be predetermined and saved in the memory 32, and may be different depending on the predetermined movement in question. Next, as shown at 508, in response to the error dropping below the desired threshold, the method includes storing the adapted output signal in connection with the predefined movement of the joystick 30 in the memory 32 of the control module. The method may then include ending the configuration mode in response to storing the adapted output signal. Alternatively, the operator may once again press the "configure" button 60 to end the configuration mode. In an alternative embodiment, a separate "end configure" button 62 may be provided, which the operator may select to end the configuration mode.

As shown at 510, the method includes controlling the propulsion device 12a, 12b according to the adapted output signal in response to the predefined movement of the joystick 30 during subsequent operation of the control system 20. Such subsequent operation occurs after the configuration mode has ended. The operator may begin operating the control system 20 in a joysticking mode after one or more predefined conditions have been met. For example, any throttle/shift lever(s) must be placed in neutral, and the joystick handle 44 subsequently must be moved from its upright position or twisted about its axis 48. This will transfer control of the propulsion devices 12a, 12b from the steering wheel 34 and throttle/shift lever(s) (not shown) to the joystick 30. During such subsequent operation of the control system 20 in the joysticking mode, as shown at 512, the method includes using low-gain feedback control to further adapt the previously adapted output signal to further reduce the error between the responsive vessel maneuver and the predefined vessel maneuver. Again, error can be detected using the AHRS 28 and/or GPS device 27. The further adapted output signal and/or parameters related thereto (described below) are then stored in the memory 32 for future use. The method thereafter includes controlling the propulsion device 12a, 12b according to the further adapted output signal in response to the predefined movement of the joystick 30, as shown at 514. In other words, the further adapted output signal and/or parameters related thereto can be used as feedforward signals in response to future inputs to the joystick 30.

Figure 7:
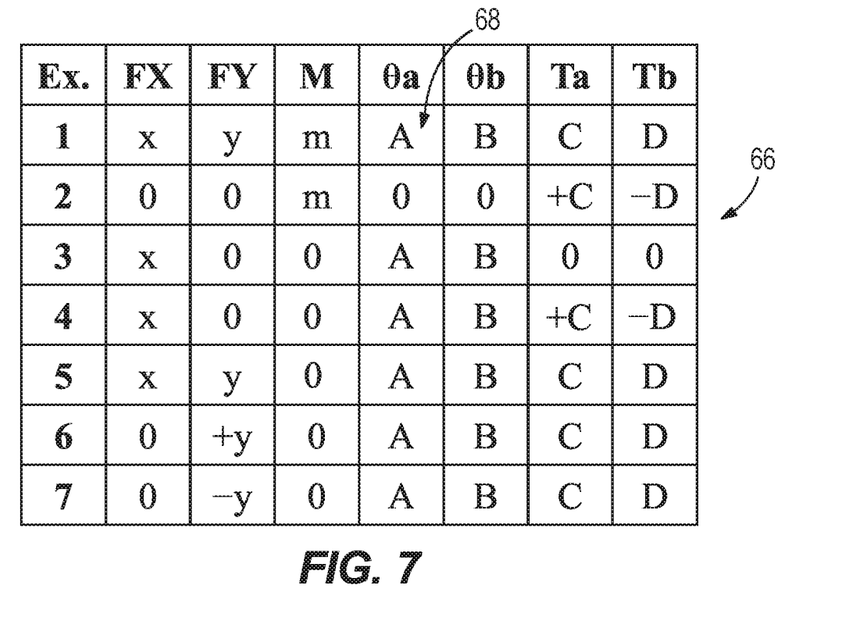
FIG. 7 illustrates one example of a base map of parameters for use with the present control system.

With reference to FIG. 7, seven examples of joystick positions are shown in combination with the resulting thrust magnitude Ta and Tb for the port and starboard marine propulsion devices 12a and 12b and the magnitude of their steering positions θa and θb. It should be understood that the magnitudes in the table 66 of FIG. 7 are exemplary and are thus represented as the letters A, B, C, and D. Theses letters represent numbers having specific units (e.g., angle or percent for steering angle and pounds or foot-pounds for thrust) and can be either positive or negative unless specifically noted as being one or the other. As described above in conjunction with FIGS. 2 and 3, the handle 44 of the joystick 30 can be moved forward, backward, to the left, to the right, and rotated to convey the desire of the operator to the CCM 24. The seven examples in FIG. 7 show only a few of the possible combinations of commands that can be received from the joystick 30. In these hypothetical examples shown in the table, the FX dimension for the joystick represents a left-right selection, the FY dimension represents a forward-reverse selection, and the M dimension represents a rotation of the handle 44 about its central axis 48 as discussed above. Naturally, a maximum movement in any direction would represent some associated maximum analogous level of thrust in that direction or some maximum moment of rotation.

In the table 66 of FIG. 7, Example 1 represents a movement of the joystick handle 44 toward the right or left to request a thrust of x units (e.g. pounds), a simultaneous movement forward or backward to request a thrust of y units, and a simultaneous rotation of the handle 44 to request a moment of m units (e.g. foot-pounds). As shown in the table 66, the CCM 24 would determine that a thrust of C units at a steering position of A units for the marine propulsion device 12a and a thrust of D units at a steering position of B units would result in the requested maneuver. Thus, in response to the input signals x, y, and m generated by movement of the handle 44, the CCM 24 will relay A, B, C, and D as output signals to the PCMs 26a, 26b for action thereupon. The table 66 in FIG. 7 is a base table and can correspond generally to the stored parameters 23 noted with respect to FIG. 1 or more specially to the lookup table 22 noted with respect to FIG. 4. However, the initial values in this table 66 may not immediately result in the expected maneuvering of the marine vessel 10, due to numerous factors described herein above.

As one example, if an operator moves the joystick 30 sideways, the marine vessel 10 might not only go sideways, but may also rotate. This is due, at least in part, to the fact that as boat speed changes, the efficiencies of the propellers 18a, 18b change and the center of pressure 41 moves, as noted above. Therefore, one or more of the output signals or parameters associated therewith may need to be adapted to balance out the increased forward efficiency and decreased backward efficiency of the propellers 18a, 18b. The output signals/parameters can be adapted based on feedback, for example from the AHRS 28 and/or GPS device 27. The CCM 24 can recognize that although the joystick 30 is commanding a maneuver sideways, yaw is detected. The CCM 24 can then adapt the parameters (such as the values in lookup table 22) to reduce the forward thrust efficiency and eliminate the unintended forward movement.

The CCM 24 can use high-gain or low-gain feedback to adapt the output signals/parameters, depending on whether the control system 20 is in the configuration mode, as noted hereinabove. Either type of feedback control can be proportional-integral-derivative (PID) feedback control or can be performed by iteratively adding or subtracting a given value to or from a given parameter or by iteratively multiplying/dividing the given parameter by a given value until error is reduced and the intended vessel maneuver is accomplished. Other types of adaptation, such as filtering, are contemplated within the scope of the present disclosure. In one example, the CCM 24 stores the adapted value back into the base table 66. For example, during a first iteration of control, the value in cell 68 might be A, during a second round it might be A—i, and during a third round it might be A—2i. In another example, instead of storing the adapted output signal into the base table 66, the CCM 24 populates an adapt table 70 (FIG. 8) with parameters with which the base values from table 66 are to be manipulated.

Figure 8:
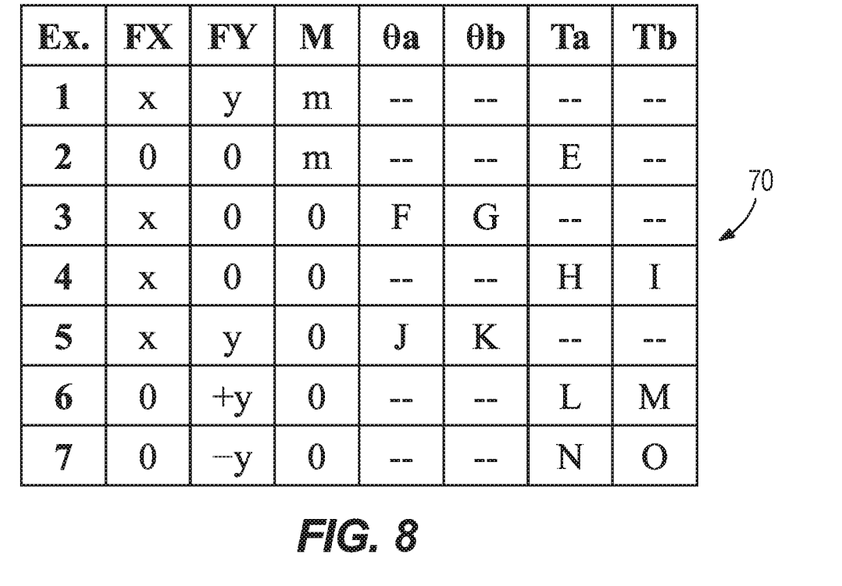
FIG. 8 illustrates one example of an adapt map of parameters for use with the present control system.

FIG. 8 shows some exemplary parameters that can be used to manipulate the output signal from the base table 66 before it is relayed to the PCMs 26a, 26b. With reference to both the base table 66 and the adapt table 70, the output signals may be determined using one or more of the following parameters:

(a) A speed parameter for a propulsion device 12a, 12b to be placed in forward gear in response to a yaw-only input to the joystick 30. See Example 2, wherein there is zero input to the joystick 30 in the FX or FY dimensions, and input m in the M dimension. Such a maneuver can be accomplished by placing both propulsion devices 12a, 12b in a straight-forward position (i.e., θa=θb=0) and operating one of the propulsion devices in forward with +C thrust and one in reverse with −D thrust. However, it is well known that the thrust efficiency of propulsion devices 12a, 12b is different in each type of gear. Thus, the adapt parameter E in table 70 is determined and is used to increase or decrease the demand of the propulsion device that is in forward gear to reduce or eliminate any fore-aft or left-right translation in response to a yaw-only command.

(b) A parameter that minimizes yaw in response to an in-gear input to the joystick 30. This is shown by Example 3, wherein although the propulsion devices 12a, 12b are in-gear, no thrust is commanded, as shown by Ta=Tb=0. The parameters F and G in table 70 are adapted to minimize yaw when the joystick commands the propulsion devices into forward or reverse gear, but without any demand above idle. For example, the steering positions of one or both of the propulsion devices 12a, 12b may need to be adjusted to cancel out any force tending to create a moment.

(c) A parameter for a propulsion device 12a or 12b to be placed in forward gear that minimizes fore-aft translation of the marine vessel 10 in response to a left-right input to the joystick 30. See Example 4, where the left-right input is x. The efficiencies of the propulsion devices 12a, 12b change as their speeds change. The parameter H is used to tune out an increase in forward efficiency of the propulsion device 12a to reduce the vessel's tendency to creep forward.

(d) A parameter for a propulsion device 12a or 12b to be placed in reverse gear that minimizes fore-aft translation of the marine vessel 10 in response to a left-right input to the joystick 30. The parameter I in Example 4 is used to tune out an increase in reverse efficiency of the propulsion device 12b to reduce the vessel's tendency to creep backward as engine speed increases.

(e) A parameter that minimizes yaw in response to a diagonal-only input to the joystick 30. See Example 5, wherein FX=x and FY=y, and zero yaw is requested. The parameters J and K can be used to adjust the steering positions to cancel out any force tending to create a moment.

(f) A parameter for a forward translation input to the joystick 30. See Example 6, in which FY=+y, and parameters L and M are used as multipliers for the output signals C and D.

(g) A parameter for a reverse translation input to the joystick 30. See Example 7, in which FY=−y, and parameters N and O are used as multipliers for the output signals C and D.

Although some specific examples are provided above, any of the parameters can be represented as adders, multipliers, lookup tables, equations, or a combination or series of adders, multipliers, lookup tables, and/or equations. For example, the values in a given base table 66 output for a given movement of the joystick 30 may be multiplied or otherwise altered by an adapted parameter determined from an adapt table 70. Alternatively, as noted herein above, the base table 66 itself may be adapted based on feedback and the adapted values stored over in the base table 66. Note that any of the above-noted measurable data and prescribed data can additionally be taken into account to determine the output signal.

Adaptation of some of the noted parameters may occur during the above-described configuration mode, while other parameters may be adapted during normal operation in the joysticking mode. Still other parameters may be adapted during both the configuration and normal joysticking modes. For example, the determination of the speed parameter for the propulsion device 12a or 12b that is in forward during a yaw-only maneuver could be made during the configuration mode, as the operator is instructed to operate the marine vessel 10 in yaw-only at various speeds. The GPS device 27 could input fore/aft velocity to the CCM 24 and the AHRS 28 could input yaw rate to the CCM 24, which would then attempt to minimize the fore/aft velocity. Such adaptation can be done using high-gain feedback control. Low-gain feedback control may then be used to further adapt the previously adapted output signal during the subsequent operation of the control system after the configuration mode has ended. For example, the speed parameter for the propulsion device 12a or 12b that is in forward during a yaw-only maneuver could be further adapted during normal operation of the marine vessel 10 any time the marine vessel 10 is translating in a left/right direction, during which a PID controller will make adjustments to minimize fore/aft movement. The further adapted output signal can then be stored over the previously adapted output signal in the base table 66, or the relevant parameter can be stored in a separate location, such as the adapt table 70. In one example, the output from the high-gain feedback control during the configuration mode is saved over in the base table 66, while a further adapted parameter determined using low-gain feedback control during normal operation is saved in the adapt table 70.

Additionally, the location of the center of gravity (which may be near the center of pressure 41) of the marine vessel 10 could be adapted during the configuration mode using aggressive (high) gains and limits per-step to allow a faster adjustment during controlled conditions. For example, this might be accomplished by way of adapting the parameter that minimizes yaw in response to an in-gear input to the joystick 30 during the configuration mode. After the configuration mode is complete, the location of the center of gravity can be further adapted to close the loop so that the operator's input results in an expected/desired output. For example, this can be done by adapting the parameter that minimizes yaw in response to a diagonal-only input to the joystick 30 by way of PID control.

Figure 6:
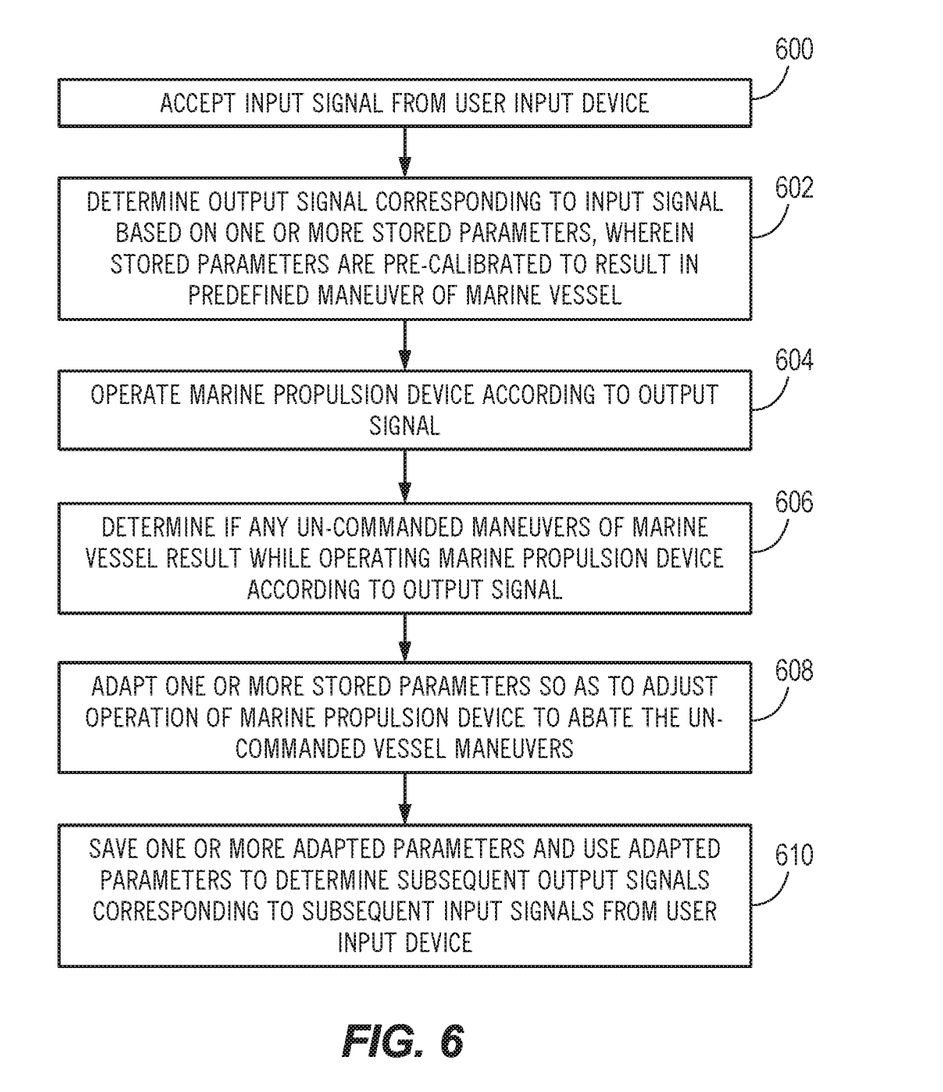
FIG. 6 illustrates another example of a method according to the present disclosure.

According to another example of the present disclosure, a method for calibrating a marine propulsion system (e.g., joystick control system 20) that controls operation of a marine propulsion device 12a, 12b on a marine vessel 10 is disclosed. As shown at 600, the method includes accepting an input signal from a user input device. In one example, the user input device is a joystick 30. As shown at 602, the method includes determining an output signal corresponding to the input signal based on one or more stored parameters 23. The stored parameters 23 are pre-calibrated to result in a predefined maneuver of the marine vessel 10. As shown at

604, the method then includes operating the marine propulsion device 12a, 12b according to the output signal, and, as shown at 606, determining if any un-commanded maneuvers of the marine vessel 10 result while operating the marine propulsion device 12a, 12b according to the output signal. Such un-commanded maneuvers can be detected by the AHRS 28 or GPS device 27, as noted above. As shown at 608, the method includes adapting one or more of the stored parameters 23 so as to adjust operation of the marine propulsion device 12a, 12b to abate the un-commanded vessel maneuvers. As shown at 610, the method also includes saving the one or more adapted parameters and using the adapted parameters to determine subsequent output signals corresponding to subsequent input signals from the user input device.

The method may also include operating the user input device according to predefined movements in a configuration mode, wherein the input signal corresponds to a given predefined movement of the user input device. The method may also include adapting the one or more of the stored parameters using high-gain feedback control while operating in the configuration mode so as to abate the un-commanded vessel maneuvers. This allows for quick adjustments during the predefined configuration mode. For example, the speed parameter for the propulsion device to be placed in forward gear in response to a yaw-only input to the joystick and/or the parameter that minimizes yaw in response to an in-gear input to the joystick 30 may both be adapted using high-gain feedback during the configuration mode. Such high-gain feedback can be PID feedback or performed by iteratively adding or subtracting a given value to or from the parameter until error is reduced and un-commanded movements are abated. The method may include exiting the configuration mode, and the control module may save the one or more adapted parameters upon exiting the configuration mode.

The method may also include further adapting the one or more adapted parameters using low-gain feedback control after exiting the configuration mode, so as to provide the less aggressive feedback control during normal operation. The control module may use the further adapted parameters to determine the subsequent output signals. According to one example, the low-gain feedback control is PID control. The method may include using a first PID control algorithm to further adapt a first adapted parameter and using a second, different PID control algorithm to further adapt a second adapted parameter. This allows for tailored adaptation of different parameters. For example, the parameter that compensates for yaw during diagonal movements may be adapted at this time using a first PID control algorithm. The speed parameter for the propulsion device to be placed in forward gear in response to a yaw-only input to the joystick 30 can be further adapted using second PID control algorithm. For example, the speed parameter can be adapted iteratively with high gain during the configuration mode and then by way of low-gain PID control during normal operation of the control system 20 thereafter. The method may also include limiting an output of the low-gain feedback control more than an output of the high-gain feedback control. Limiting the output on control provides further constraints (beyond using low or high gain) on how much adaptation can occur while in a certain mode.

The method may also include further adapting the one or more adapted parameters in response to the user input device being operated according to the given predefined movement, in order to adjust operation of the marine propulsion device 12a, 12b to further abate the un-commanded vessel maneuvers. In other words, the further adaptation using low-gain feedback control might be limited to those instances in which the joystick's movements are the same as those that were commanded during the configuration mode.

Note that the same parameters do not need to be adapted both during the high-gain configuration mode and the low-gain normal operating mode. For example, the control module might perform adaptation iteratively without PID control during the configuration mode for only certain parameters. Then, the control module might continue to adapt these parameters without PID control during normal operation. Entirely different parameters may be adapted during normal operation in the joysticking mode using PID control than were adapted while in the configuration mode.

Through this process of entering measurable or prescribed data, and subsequently adapting non-measurable data by way of aggressive feedback control during a predefined configuration mode, followed by less aggressive feedback control during normal operation of the marine vessel 10, the calibration of a joystick control system 20 on a marine vessel 10 can take place without requiring a trained engineer to be aboard the boat with access to the calibration tables.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

What is claimed is:

1. A method for calibrating a joystick control system on a marine vessel having a marine propulsion device coupled thereto, the method comprising:
   accepting from a joystick a predefined movement intended to carry out a predefined vessel maneuver;
   determining, with a control module, an output signal corresponding to the predefined movement of the joystick;
   controlling the propulsion device according to the output signal and measuring a responsive maneuver of the marine vessel;
   using high-gain feedback control to adapt the output signal until an error between the responsive vessel maneuver and the predefined vessel maneuver is below a desired threshold;
   in response to the error dropping below the desired threshold, storing the adapted output signal in connection with the predefined movement of the joystick in a memory of the control module; and
   controlling the propulsion device according to the adapted output signal in response to the predefined movement of the joystick during subsequent operation of the joystick control system.

2. The method of claim 1, further comprising:
   using low-gain feedback control to further adapt the previously adapted output signal to further reduce the error between the responsive vessel maneuver and the predefined vessel maneuver during the subsequent operation of the joystick control system; and thereafter controlling the propulsion device according to the further adapted output signal in response to the predefined movement of the joystick.

3. The method of claim 2, further comprising storing measureable data and prescribed data in the memory and using at least one of the measurable data and the prescribed data to determine the output signal.

4. The method of claim 3, wherein the measureable data comprises one or more of:
a trim angle of the propulsion device at which a thrust produced by the propulsion device is horizontally-oriented;
a number of turns of a steering wheel required to achieve a maximum steering angle of the propulsion device;
steering angles of the propulsion device that correspond to given positions of the steering wheel;
a maximum allowable steering angle of the propulsion device;
a maximum speed of the marine vessel;
a length of the marine vessel;
a separation distance between a pair of marine propulsion devices coupled to the marine vessel;
a horizontal distance from a transom of the marine vessel or from the propulsion device to a center of mass or a center of pressure of the marine vessel;
a beam of the marine vessel;
a hull type of the marine vessel;
a displacement of the marine vessel;
a mass of the marine vessel;
a gear case ratio of the propulsion device; and
a pitch of a propeller of the propulsion device.

5. The method of claim 3, wherein the prescribed data comprises one or more of:
a number of turns of a steering wheel required in order to achieve a maximum steering angle of the propulsion device;
steering angles of the propulsion device that correspond to given positions of the steering wheel; and
a limit on a speed of an engine powering the propulsion device that is intended to prevent propeller blowout.

6. The method of claim 2, wherein the marine vessel has two propulsion devices coupled thereto, and wherein the further adapted output signal is determined using one or more of:
a speed parameter for a propulsion device to be placed in forward gear in response to a yaw-only input to the joystick;
a parameter that minimizes yaw in response to an in-gear input to the joystick;
a parameter for a propulsion device to be placed in forward gear that minimizes fore-aft translation of the marine vessel in response to a left-right input to the joystick;
a parameter for a propulsion device to be placed in reverse gear that minimizes fore-aft translation of the marine vessel in response to a left-right input to the joystick;
a parameter that minimizes yaw in response to a diagonal-only input to the joystick;
a parameter for a forward translation input to the joystick; and
a parameter for a reverse translation input to the joystick.

7. The method of claim 6, wherein one or more of the parameters is a multiplier.

8. The method of claim 6, wherein one or more of the parameters is a lookup table.

9. The method of claim 2, further comprising:
accepting a command to operate the joystick control system in a configuration mode;
thereafter prompting an operator of the joystick control system to move the joystick according to the predefined movement; and
ending the configuration mode in response to storing the adapted output signal.

10. The method of claim 9, further comprising using the low-gain feedback control to further adapt the previously adapted output signal during the subsequent operation of the joystick control system after the configuration mode has ended.

11. The method of claim 2, further comprising storing the further adapted output signal over the previously adapted output signal.

12. A method for calibrating a marine propulsion system that controls operation of a marine propulsion device on a marine vessel, the method comprising:
accepting an input signal from a user input device;
determining an output signal corresponding to the input signal based on one or more stored parameters, wherein the stored parameters are pre-calibrated to result in a predefined maneuver of the marine vessel;
operating the marine propulsion device according to the output signal;
determining if any un-commanded maneuvers of the marine vessel, not corresponding to the predefined maneuver, result while operating the marine propulsion device according to the output signal;
adapting one or more of the stored parameters so as to adjust operation of the marine propulsion device to abate the un-commanded vessel maneuvers; and
saving the one or more adapted parameters and using the one or more adapted parameters to determine subsequent output signals corresponding to subsequent input signals from the user input device.

13. The method of claim 12, wherein the user input device is configured to operate according to predefined movements in a configuration mode, and wherein the input signal corresponds to a given predefined movement of the user input device.

14. The method of claim 13, further comprising adapting the one or more of the stored parameters using high-gain feedback control while operating in the configuration mode so as to abate the un-commanded vessel maneuvers.

15. The method of claim 14, further comprising:
exiting the configuration mode; and
saving the one or more adapted parameters upon exiting the configuration mode.

16. The method of claim 15, further comprising:
further adapting the one or more adapted parameters using low-gain feedback control after exiting the configuration mode; and
using the one or more further adapted parameters to determine the subsequent output signals.

17. The method of claim 16, wherein the low-gain feedback control is proportional-integral-derivative (PID) control.

18. The method of claim 17, further comprising using a first PID control algorithm to further adapt a first adapted parameter and using a second, different PID control algorithm to further adapt a second adapted parameter.

19. The method of claim 16, further comprising limiting an output of the low-gain feedback control more than an output of the high-gain feedback control.

20. The method of claim 16, further comprising further adapting the one or more adapted parameters in response to the user input device being operated according to the given predefined movement, in order to adjust operation of the marine propulsion device to further abate the un-commanded vessel maneuvers.

* * * * *